US008199772B2

(12) United States Patent
Surek

(10) Patent No.: US 8,199,772 B2
(45) Date of Patent: Jun. 12, 2012

(54) SYSTEMS AND METHODS FOR SYNCHRONOUS GENERIC FRAMING PROTOCOL MAPPING

(75) Inventor: Steven Arvo Surek, Leonardo, NJ (US)

(73) Assignee: Ciena Corporation, Linthicum, MD (US)

(*) Notice: Subject to any disclaimer, the term of this patent is extended or adjusted under 35 U.S.C. 154(b) by 788 days.

(21) Appl. No.: 12/146,048

(22) Filed: Jun. 25, 2008

(65) Prior Publication Data
US 2009/0323727 A1  Dec. 31, 2009

(51) Int. Cl.
*H04J 3/16* (2006.01)
(52) U.S. Cl. ........................................... 370/467
(58) Field of Classification Search .................. 370/474, 370/498, 503, 545, 351, 389, 392, 395.1, 370/395.5, 431, 458–459, 464–467, 469, 370/501, 522; 714/799, 800, 806, 807, 811, 714/819, 699, 746, 752, 758
See application file for complete search history.

(56) References Cited

U.S. PATENT DOCUMENTS

| 6,061,354 | A  | * | 5/2000 | Morikawa et al. | 370/395.7 |
| 7,127,653 | B1 | * | 10/2006 | Gorshe | 714/746 |
| 7,133,416 | B1 | * | 11/2006 | Chamdani et al. | 370/466 |
| 7,716,379 | B2 | * | 5/2010 | Ruan et al. | 709/250 |
| 7,826,741 | B2 | * | 11/2010 | Katagiri | 398/43 |
| 2003/0031269 | A1 | * | 2/2003 | Verbin | 375/295 |
| 2003/0185230 | A1 | * | 10/2003 | Fisher et al. | 370/464 |
| 2004/0062277 | A1 | * | 4/2004 | Flavin et al. | 370/474 |
| 2005/0074032 | A1 | * | 4/2005 | Surek | 370/503 |
| 2005/0117585 | A1 | * | 6/2005 | Linkewitsch et al. | 370/395.5 |
| 2006/0013293 | A1 | * | 1/2006 | Hirsch | 375/220 |
| 2006/0050709 | A1 | * | 3/2006 | Sung et al. | 370/394 |
| 2007/0116046 | A1 | * | 5/2007 | Liu et al. | 370/466 |
| 2008/0260382 | A1 | * | 10/2008 | Okazaki | 398/45 |
| 2009/0148161 | A1 | * | 6/2009 | Walker et al. | 398/43 |
| 2009/0213873 | A1 | * | 8/2009 | Frlan et al. | 370/464 |

* cited by examiner

*Primary Examiner* — Anh-Vu Ly
*Assistant Examiner* — Omar Ghowrwal
(74) *Attorney, Agent, or Firm* — Clements Bernard PLLC; Christopher L. Bernard; Lawrence A. Baratta, Jr.

(57) ABSTRACT

The present invention provides systems and methods for mapping synchronous input signals, such as synchronous Ethernet, into Generic Framing Protocol (GFP) frames for using GFP directly on Optical Transport Network (OTN) while preserving the synchronous timing of the input signals. The present invention defines a mapping technique for GFP-based encapsulation that preserves timing information of an incoming client signal. The mapping technique makes use of the concept that a timing signal can be fractionally multiplied in frequency using factors that are ratios of integers without creating significant timing impairments.

20 Claims, 7 Drawing Sheets

SYSTEMS AND METHODS FOR SYNCHRONOUS GENERIC FRAMING PROTOCOL MAPPING

FIELD OF THE INVENTION

The present invention relates generally to telecommunications and datacommunications. More particularly, the present invention provides systems and methods for mapping synchronous input signals, such as synchronous Ethernet, into Generic Framing Protocol (GFP) frames for using GFP directly on Optical Transport Network (OTN) while preserving the synchronous timing of the input signals.

BACKGROUND OF THE INVENTION

The growth of packet data services to support the transport of the Internet Protocol (IP) has now made packet data transmission the dominant application in telecommunication networks. This is stimulating an evolution of traditional voice centric telecommunications network designs toward more data centric designs. These data centric designs are converging toward a single packet transport technology based on Ethernet which is well suited for carrying IP traffic. Ethernet networks are now capable of supporting transport of not only packet based services, but voice and video services, allowing true convergence to a single networking technology. Support for voice services requires network timing synchronization for most applications. However, given that Ethernet is inherently an asynchronous technology, transport of timing information via Ethernet has been an issue.

Recently, the International Telecommunications Union (ITU) has developed standards for the transport of timing information via Ethernet links which have been documented in ITU-T Recommendation G.8261 as well as standards for synchronous Ethernet Equipment Clocks which have been documented in ITU-T Recommendation G.8262. These standards require that synchronous Ethernet line interfaces be synchronized to network timing sources, which then allow the lines themselves to serve as timing references. However, Ethernet signals, either synchronous or asynchronous, often need to be transported via optical transmission systems between network locations. Due to the number of Ethernet line interfaces and their bandwidths (from 10 Mbps to 10 Gbs and soon to be extended to 100 Gbps), these links are generally multiplexed together electrically before transmission over the optical network in order to improve wavelength utilization. Today this is typically accomplished by mapping the Ethernet signal into synchronous digital hierarchy (SDH) or synchronous optical network (SONET) networks, which are in turn carried over dense wavelength division multiplexed (DWDM) optical transport systems, such as those based on ITU optical transport network (OTN) standards defined in ITU-T Recommendation G.709.

In order to support synchronous Ethernet line interfaces transported via SONET/SDH networks it is required that both the Ethernet line interfaces and the SDH/SONET networks be synchronized to network timing. This is accomplished in one of two ways: synchronize the SDH/SONET network to network timing then synchronize the Ethernet line interfaces to the SDH/SONET network, or synchronize the Ethernet line interfaces to network timing then synchronize the SDH/SONET network to the Ethernet line interfaces. The first case is termed external timing from the perspective of the SDH/SONET network, while the second case is termed line timing from the SDH/SONET network perspective. Mechanisms for implementing either of these two approaches are well known and can be supported in SDH/SONET networks.

Ethernet signals are transported via the SONET/SDH network by mapping them into SONET/SDH payload containers using a mapping technique called Generic Framing Procedure (GFP). GFP is a mapping technique defined by ITU-T Recommendation G.7041. This mapping technique improves transport bandwidth efficiency by either stripping off unneeded Ethernet characters (Frame mapped GFP or GFP-F), or encoding the Ethernet stream to reduce its bandwidth while preserving all relevant payload information (transparent GFP or GFP-T). However, the GFP mapping techniques do not preserve the timing integrity of a synchronous Ethernet link due to the removal of characters or the encoding process. It is only by synchronizing the Ethernet link to the SONET/SDH timing that synchronization is preserved. This is not an issue for SONET/SDH networks because timing information is not carried through the mapping process through separate timing circuits supporting the external and line timed approaches described above.

It is also possible to carry Ethernet signals directly on OTN-based DWDM systems. OTN-based DWDM networks are asynchronous networks, that is, they are not synchronized to network timing. Therefore there is no external timing or line timing mechanism available to transport synchronous Ethernet timing information. The only standards-based mechanism for mapping Ethernet signals into OTN uses the GFP mapping technique described above, but this method does not preserve the timing integrity of the client signal.

The problem with the current state of the art is that the presence of a SDH/SONET layer is required to provide the transport of synchronous Ethernet signals along across an OTN-based DWDM network and preserve their timing integrity. It is highly desirable to be able to transport synchronous Ethernet signals directly over OTN transport systems without requiring an underlying SONET/SDH infrastructure and making network convergence to a single networking technology (Ethernet only instead of Ethernet plus SDH/SONET) possible. This is problematic since OTN-based DWDM networks are defined to operate asynchronously and there is currently no standardized mapping defined for Ethernet signals into OTN that would preserve the timing information of synchronous Ethernet line interfaces. The only standard mapping mechanism that exists within the OTN standard uses a GFP-based mapping technique which does not preserve timing information but provides better bandwidth efficiency. The only standards-based OTN client signal mapping technique that will support the preservation of timing information is a constant bit-rate (CBR) mapping mechanism, which could be applied to synchronous Ethernet client signals, but does not have the bandwidth efficiency provided by the standard GFP mapping technique.

BRIEF SUMMARY OF THE INVENTION

In various exemplary embodiments, the present invention provides systems and methods for mapping synchronous input signals, such as synchronous Ethernet, into Generic Framing Protocol frames for using GFP directly on Optical Transport Network (OTN) while preserving the synchronous timing of the input signals. The present invention defines a mapping technique for GFP-based encapsulation that preserves timing information of an incoming client signal. The mapping technique makes use of the concept that a timing signal can be fractionally multiplied in frequency using factors that are ratios of integers without creating significant timing impairments.

In an exemplary embodiment of the present invention, a synchronous Generic Framing Protocol mapper includes a fractional M/N clock generator configured to receive an incoming client timing signal and to generate a M/N clock by digitally multiplying the incoming client timing signal by a ratio M/N where M and N are integers; and a frame encoder configured to receive an incoming client signal and to encode the incoming client signal into Generic Framing Protocol frames such that an output signal including a Generic Framing Protocol-mapped signal operates synchronously with the M/N clock. The synchronous Generic Framing Protocol mapper can further include a decoder configured to receive an incoming client signal and to decode the incoming client signal. The decoder is configured to perform 8B/10B decoding; to determine validity of each data word from the incoming client signal; to determine whether each data word from the incoming signal is a control word or a data word; and to output each data word, an error indication, and a control/data word indication to the frame encoder. The synchronous Generic Framing Protocol mapper can further include a multiplexer configured to receive Generic Framing Protocol frames from the frame encoder and to insert Generic Framing Protocol IDLE frames responsive to the M/N clock from an IDLE generator responsive to no Generic Framing Protocol frame availability from the frame encoder. Optionally, the synchronous Generic Framing Protocol mapper further includes an Optical Transport Network constant bit-rate mapper configured to receive an output of the multiplexer, wherein the Optical Transport Network constant bit-rate mapper utilizes justification control and data justification functions to adapt a rate of the output of the multiplexer to a payload clock from a system clock. Alternatively, the synchronous Generic Framing Protocol mapper further includes a Regenerator/Reshaper/Retimer device configured to receive an output of the multiplexer.

The Generic Framing Protocol-mapped signal can include a frame mapped Generic Framing Protocol signal, wherein the frame encoder is configured to: extract valid Ethernet media access control and data frames from the decoded incoming client signal; drop errored frames, control frames, and frames with invalid frame check sequence; encapsulate remaining frames into a Generic Framing Protocol frame with a Generic Framing Protocol header; provide Generic Framing Protocol frames responsive to the M/N clock; and signal to an IDLE generator to provide Generic Framing Protocol IDLE frames responsive to no Generic Framing Protocol frame availability. Alternatively, the Generic Framing Protocol-mapped signal includes a transparent Generic Framing Protocol signal, wherein the frame encoder is configured to: perform 64B/65B encoding of the decoded incoming client signal, wherein data code words are converted to eight-bit values, control code words are converted to four-bit values, and errored code words are converted to a special four-bit code indicating an error; group blocks from the 64B/65B encoding into a superblock; encapsulate the superblock into a Generic Framing Protocol frame with a Generic Framing Protocol header; provide Generic Framing Protocol frames responsive to the M/N clock; and perform one of signal to an IDLE generator to provide Generic Framing Protocol IDLE frames responsive to no Generic Framing Protocol frame availability, insert a PAD code word, and a combination thereof.

In another exemplary embodiment of the present invention, a synchronous Generic Framing Protocol demapper includes a fractional M/N clock generator configured to receive an incoming M/N clock from a client timing signal and to generate an outgoing client clock signal by digitally multiplying the incoming client timing signal by a ratio N/M where M and N are integers; and a frame decoder configured to receive a Generic Framing Protocol-mapped incoming signal and to decode the incoming signal from Generic Framing Protocol frames such that an output signal including a client signal operates synchronously with the incoming M/N clock. The synchronous Generic Framing Protocol demapper can further include an encoder configured to receive an output signal and to encode the output signal into an 8B/10B format. The synchronous Generic Framing Protocol demapper can also further include a selector configured to receive control words, data words, a control/data word indicator, and a frame available signal from the frame decoder and to insert IDLE Ethernet sequences from an IDLE generator responsive to no frame availability from the frame decoder. Optionally, the synchronous Generic Framing Protocol demapper further includes an Optical Transport Network constant bit-rate demapper configured to provide an output to the frame decoder. Alternatively, the synchronous Generic Framing Protocol demapper further includes a Regenerator/Reshaper/Retimer device configured to provide an output to the frame decoder.

The Generic Framing Protocol-mapped incoming signal can include a frame mapped Generic Framing Protocol signal, wherein the frame decoder is configured to: frame to the Generic Framing Protocol-mapped incoming signal; interpret header information; extract client data stream information; output an Ethernet frame from the client data stream information synchronous to the outgoing client clock signal; and signal to an IDLE generator to provide Ethernet IDLE sequences responsive to no Ethernet frame availability. Alternatively, the Generic Framing Protocol-mapped signal includes a transparent Generic Framing Protocol signal, wherein the frame encoder is configured to: frame to the Generic Framing Protocol-mapped incoming signal; interpret header information; extract client data stream information; drop any PAD characters; output an Ethernet frame from the client data stream information synchronous to the outgoing client clock signal; and signal to an IDLE generator to provide Ethernet IDLE sequences responsive to no Ethernet frame availability.

In yet another exemplary embodiment of the present invention, a method of synchronous Generic Framing Protocol encapsulation includes deriving a fractional M/N clock rate from a clock associated with an incoming data stream, wherein M and N are integers; extracting words from the incoming data stream; dropping any errored words, control words, and words with invalid frame check sequence; encapsulating remaining words into a Generic Framing Protocol frame with a Generic Framing Protocol header; and providing the Generic Framing Protocol frames at the fractional M/N clock rate to be mapped. The method of synchronous Generic Framing Protocol encapsulation can further include receiving mapped Generic Framing Protocol frames; extracting the fractional M/N clock rate from the received mapped Generic Framing Protocol frames; extracting header and client data stream information from the received mapped Generic Framing Protocol frames; dropping IDLE frames and PAD characters from the received mapped Generic Framing Protocol frames; calculating an output clock from the fractional M/N clock rate, wherein the output clock is synchronous to the clock associated with the incoming data stream; and providing Ethernet frames at the output clock rate. The method of synchronous Generic Framing Protocol encapsulation can also further include inserting IDLE Generic Framing Protocol frames responsive to no available Generic Framing Protocol frames. Optionally, the method of synchronous Generic Framing Protocol encapsulation further includes mapping the provided Generic Framing Protocol frames at the fractional M/N clock rate through an Optical Transport Network constant bit-rate mechanism; and transmitted an output of the Optical Transport Network constant bit-rate mechanism. The method of synchronous Generic Framing Protocol encapsulation can further include inserting IDLE Ethernet sequences responsive to no available Ethernet frames.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides systems and methods for synchronous GFP mapping. The present invention makes it possible to efficiently transport synchronous Ethernet client signals as well as other synchronous client signals that are mapped using GFP directly over OTN networks while preserving timing integrity. Advantageously, the present invention removes the requirement for intermediate layers, such as SONET/SDH, to transport synchronous Ethernet client signals and the like providing improvements in bandwidth efficiency and cost.

The present invention defines a mapping technique for GFP-based encapsulation that preserves timing information of an incoming client signal. In an exemplary embodiment, the present invention specifically addresses synchronous Ethernet applications using Gigabit Ethernet (GbE) links, but the present invention can be applied to any client signal encapsulated using GFP where preservation of timing information is desirable (e.g., Digital Video Broadcast signals and the like).

The mapping technique makes use of the concept that a timing signal can be fractionally multiplied in frequency using factors that are ratios of integers without creating significant timing impairments. This allows for a two stage mapping process for a synchronous GFP mapper. A first stage recovers client signal timing and creates a synchronous fractional clock from the recovered timing signal (the incoming client timing signal is digitally multiplied by a ratio M/N where M and N are integers). The client signal itself is mapped using GFP such that the resulting GFP-mapped signal operates synchronously with the fractional clock generated from the incoming client signal timing. This produces a synchronous GFP mapping. In a second stage, the GFP-mapped client signal is mapped into an OTN network using standard CBR mapping techniques (utilizing bit-synchronous or asynchronous CBR mapping methods that employ justification/justification control operations). The mapped signal is then transported via the OTN network.

Once the client signal has been transported to its destination, it is demapped from the OTN network using the inverse operations, again in a two-stage process for a synchronous GFP demapper. In a first stage, the synchronous GFP-mapped client signal and its timing are recovered from the OTN network using standard CBR demapping processes (justification/justification control and clock recovery processes). The recovered synchronous GFP-mapped client timing signal is used to generate the original client timing signal recovered at the mapper (the recovered synchronous GFP-mapped client timing signal is multiplied by the inverse factor used at the mapper, i.e., N/M). The second stage uses the regenerated client timing signal to drive the GFP demapping operation and generate an output client signal synchronous to the input client signal received at the mapper.

Figure 1:
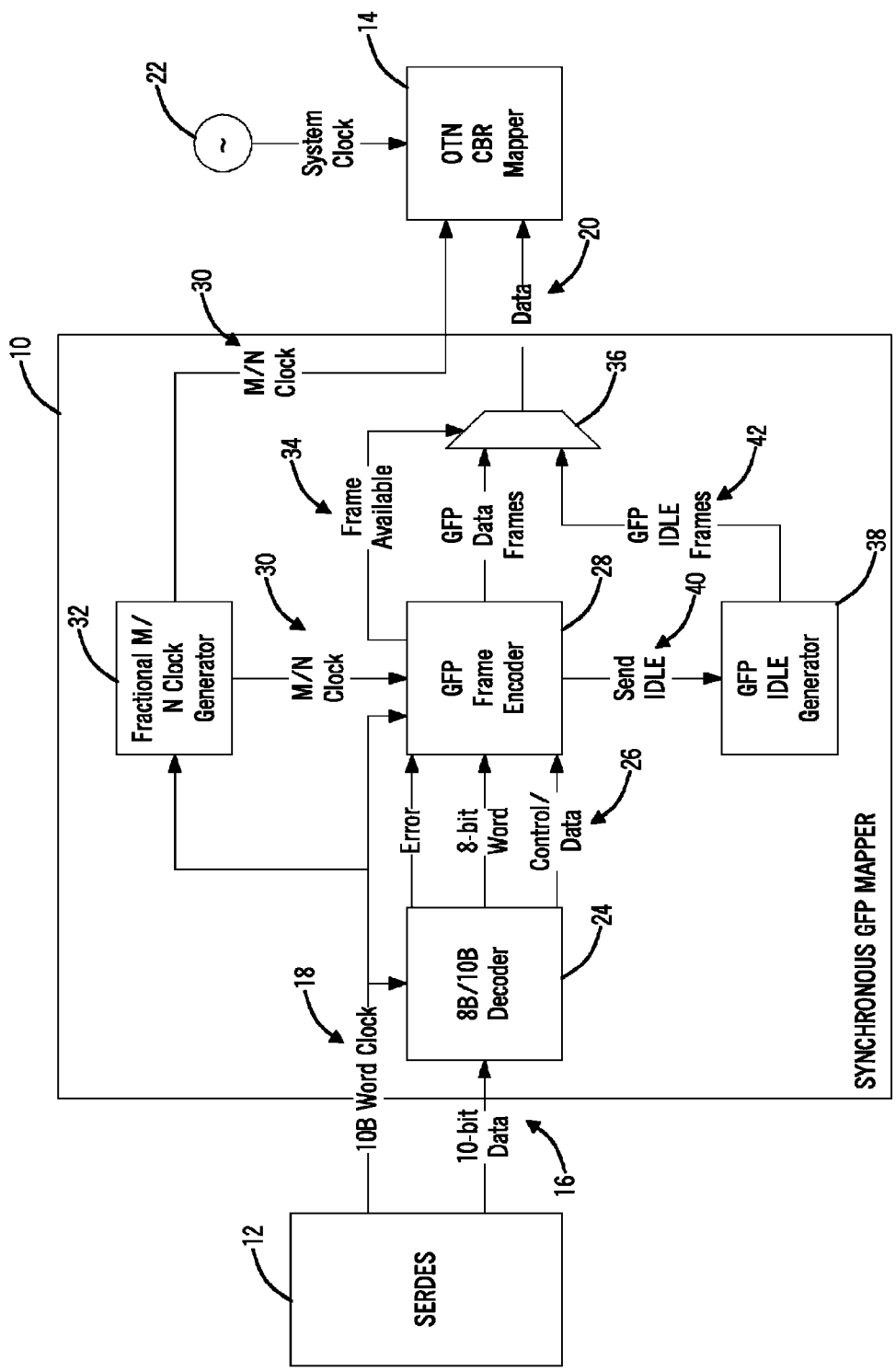
FIG. 1 is a block diagram of a synchronous GFP mapper according to an exemplary embodiment of the present invention.

Referring to FIG. 1, a synchronous GFP mapper 10 is illustrated according to an exemplary embodiment of the present invention. The synchronous GFP mapper 10 is configured to receive a client signal, such as from a (serializer/deserializer) SERDES 12 or the like, and to provide a synchronous output stream to an OTN CBR mapper 14 or the like. The SERDES 12 recovers an incoming client clock from an incoming serial client bit stream, divides the client clock by 10 to produce a 10B word clock, and converts the incoming serial client bit stream to a 10-bit parallel stream. The SERDES 12 can include any device that recovers a client signal clock and data, i.e., whether the clock has been divided or not or whether the data is serial or parallel with any particular bus width. Outputs from the SERDES 12, e.g., 10-bit data 16 and a 10B word clock 18, are input to the synchronous GFP mapper 10. The synchronous GFP mapper 10 performs GFP mapping synchronous to the incoming client signal clock and provides the synchronous output data stream and its clock to the OTN CBR mapper 14.

An output data stream 20 of the synchronous GFP mapper 10 runs at the fractional clock rate synchronous to the input clock rate 18. The OTN CBR mapper 14 is required for implementation over an OTN network. The OTN CBR mapper 14 is configured to provide standard G.709 CBR mapping functions with the exception that fixed stuff bytes are added to the payload area of the OTN frame to adjust its bandwidth as close as possible to the nominal rate of the synchronous GFP mapper 10 output. The OTN CBR mapper 14 utilizes standard justification control and data justification functions to adapt the rate of the incoming synchronous GFP data stream, i.e., the output data stream 20, to an OTN payload clock from a system clock 22. This justification function allows client clock variation of +/−45 ppm to be supported, well within the worst case +/−20 ppm range of a synchronous Ethernet client signal. Additionally, the synchronous GFP mapper 10 can be used with other transport mapping functions, for example, any 3R (Regenerator/Reshaper/Retimer) regeneration function could replace the OTN CBR mapper 14 in FIG. 1. In fact any mapping function for any transport system that supports transparent mapping of a client signal while preserving its timing integrity is applicable.

The synchronous GFP mapper 10 first decodes the incoming 10-bit data stream 16 into 8-bit words through an 8B/10B decoder 24. The 8B/10B decoder 24 first determines the validity of each incoming 10-bit data word 16 and, if invalid, asserts an error output. If the word is valid, it is converted to an 8-bit code plus an indication as to whether the word is a 10B control code or a 10B data word. The error output and the 8-bit code plus control/data word outputs, collectively references as outputs 26, are provided to a GFP frame encoder 28 along with the 10B word clock 18 and an M/N fractional clock 30 derived from the 10B word clock 18 by a fractional M/N clock generator 32.

The GFP frame encoder 28 can perform either GFP-F or GFP-T encoding. For GFP-F encoding, valid Ethernet media access control (MAC) frames are extracted from the 8-bit data stream (from the outputs 26). MAC frames are delineated by valid start-of-frame (SOF) and end-of-frame (EOF) 10B control codes. Any MAC frames containing one or more 8-bit data words within the frame that are marked as either errored or as control words are dropped, as well as any MAC frames that contain an invalid frame check sequence (FCS). Each MAC frame is then encapsulated into a GFP frame by adding GFP header bytes. A resulting output data stream is operating at a slower rate than the incoming 10-bit data stream 16 and this where the fractional M/N clock 30 is applied. GFP-F frames are clocked out of the GFP frame encoder 28 using the M/N clock 30. The M/N clock 30 rate must be greater than or equal to a maximum possible rate of the data stream produced by the GFP frame encoder 28. When there is a GFP data frame ready to be transmitted from the GFP frame encoder 28, a frame available signal is asserted which controls an output multiplexer 36 to select data from the GFP Frame Encoder output. When the GFP frame encoder 28 has no GFP data frames to output, the Frame Available signal is de-asserted causing the output multiplexer 36 to select an input from a GFP IDLE generator 38 (i.e., a Send Idle signal 40 is sent from the GFP frame encoder 28 to the GFP IDLE generator 38, and GFP IDLE frames 42 are provided to the multiplexer 36), and it drives the GFP IDLE generator 38 with a gapped clock that operates at the M/N clock rate, the Send Idle signal, that produces a sequence of clock pulses which is always a multiple of 4 (each GFP IDLE frame is four 8-bit words). When another GFP data frame is available and the number of Send Idle pulses is a multiple of four, the frame available signal is again asserted and the Send Idle signal is de-asserted. The output data stream 20 is now operating at the M/N Clock 30 rate and is synchronous to the incoming 10B Word Clock 18.

For GFP-T encoding, the incoming data words are first encoded using a GFP 64B/65B encoding in the GFP frame encoder 28. The GFP frame encoder 28 converts a stream of eight 10B code words, which includes 80 bits, and encodes them into 65 bits of information. Data code words are converted to their eight-bit values while Control code words are converted to four-bit values. Errored code words are converted to a special four-bit code indicating an error. Eight of these 65-bit blocks are grouped into a 65-byte superblock and a 16-bit CRC field is added to provide error checking. Multiple superblocks may then be concatenated together and placed within a GFP frame by adding GFP header bytes. The resulting output data stream 20 is operating at a slower rate than the incoming 10-bit data stream 16. This is where the fractional M/N clock 30 is applied. The GFP-T frames are clocked out of the GFP frame encoder 28 using the M/N clock 30. The M/N clock 30 rate must be greater than or equal to the maximum possible rate of the data stream produced by the GFP frame encoder 28. In the GFP-F case, the output for the GFP frame encoder 28 is rate adapted to the fractional M/N clock 30 by inserting GFP IDLE frames 42 when there is no frame available to be sent. In the case of GFP-T encoding, the same mechanism can be used, but another mechanism is also possible. The 64B/65B encoding process provides a special code word called a PAD character, to be inserted into the GFP-T superblock whenever a code word needs to be transmitted but none is immediately available from the incoming data stream 16. The insertion of PAD characters can be utilized instead of, or in conjunction with, the insertion of GFP IDLE frames 42 (as described for GFP-T) in order to match the rate of the output data stream 20 from the GFP frame encoder 28 to the fractional M/N clock 30. If PAD insertion alone is used to provide the rate matching, then the 64B/65B encoding, cyclic redundancy check (CRC) insertion, superblock concatenation, and GFP header byte insertion processes must all operate with respect to the fractional M/N clock 30 and a PAD character would be inserted by the 64B/65B encoder when no input code word was available for immediate insertion.

Figure 2:
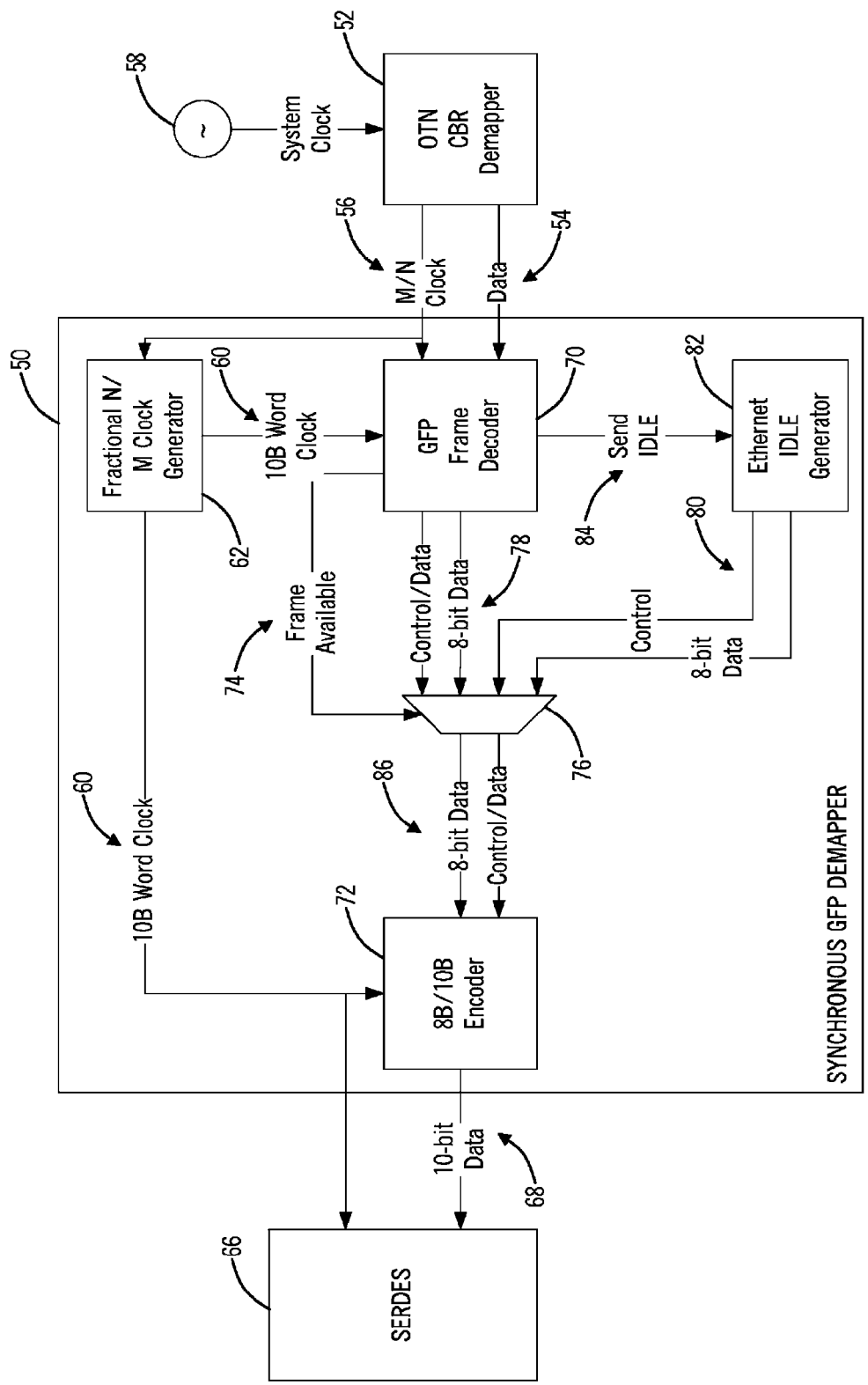
FIG. 2 is a block diagram of a synchronous GFP demapper according to an exemplary embodiment of the present invention.

Referring to FIG. 2, a synchronous GFP demapper 50 is illustrated according to an exemplary embodiment of the present invention. An OTN CBR demapper 52 is required for implementation over an OTN network. The OTN CBR demapper 52 provides the standard G.709 CBR demapping function with the exception that fixed stuff bytes are added to the payload area of the OTN frame to adjust its bandwidth as close as possible to the nominal rate of synchronous GFP mapper 10 output. The OTN CBR demapper 52 recovers a client data stream 54 (the ingress synchronous GFP mapper output 20) and its clock 56, and the OTN CBR demapper 52 receives an input from a system clock 58. The incoming justification control information is interpreted and the client payload data is extracted from the valid payload byte positions (the fixed stuff bytes added at the OTN CBR mapper 14 are ignored by the demapper 52). This signal is then passed through a desynchronizer with the appropriate filter bandwidth required to remove jitter components and recover the client signal payload clock. The recovered clock 56 and data 54 from the OTN CBR demapper 52 is passed to the synchronous GFP demapper 50. Other transport demapping functions, for example, any 3R clock and data recovery function could replace the OTN CBR demapper 50, such as a 3R clock and data recovery function used in conjunction with a 3R regenerator function provided for transport mapping. In fact any demapping function for any transport system that supports transparent mapping of a client signal while preserving its timing integrity is applicable.

The synchronous GFP demapper 50 performs GFP frame decoding of the recovered client signal 54 and provides an output data stream synchronous to a 10B word clock 60 produced by a fractional N/M clock generator 62. A SERDES 66 converts an incoming 10-bit parallel stream 68 to a serial client bit stream using the 10B word clock 60 as a reference. Any device that generates an output data stream based on an input stream and an input clock reference whether the clock has been divided or not or whether the data is serial or parallel with any particular bus width, is applicable for the SERDES 66.

The synchronous GFP demapper 50 includes a GFP frame decoder 70, the fractional N/M clock generator 62, and an 8B/10B encoder 72. The GFP frame decoder 70 performs either GFP-F or GFP-T decoding. It first frames on the GFP data stream using the GFP header information. Any GFP Idle frames are then dropped. Once framing has been achieved, the header information can be interpreted and client data stream information can be extracted through the GFP frame decoder 70. The resulting data stream will be either client data frames or GFP superblocks, depending on whether the GFP mapping was GFP-F or GFP-T, respectively. When an Ethernet frame is available for transmission, the GFP frame decoder 70 asserts a Frame Available signal 74 which controls a selector 76 to accept outputs 78 of the GFP frame decoder 70 as its output. The GFP frame decoder 70 transmits the Ethernet frame, preceded by an Ethernet preamble and followed by an Ethernet end-of-frame, in a format consisting of 8-bit words plus a control/data indication, collectively referred to as outputs 78. The control/data indication identifies whether the 8-bit word represent data to be encoded on a representation of a 10B control word. This signal is clocked out of the GFP frame decoder 70 using the 10B word clock 60 generated by the fractional N/M clock generator 63. The factor N/M is the inverse of the M/N value used at the GFP mapper 10 and is what provides the synchronization of the ingress and egress data streams. When there is no Ethernet frame to be sent, the Frame Available signal 74 is de-asserted, which causes the selector 76 to accept a signal 80 from an Ethernet Idle generator 82, and a Send Idle gapped clock signal 84, which is synchronous to the N/M clock, is asserted toward the Ethernet Idle generator 82 causing it to output Ethernet Idle sequences. Idles are always sent such that the minimum Ethernet inter-frame gap is provided before the next frame is transmitted. The resulting output data stream, including both 8-bit data 86 and the 10-bit data 68, is now operating synchronous to the ingress 10-bit data stream 16 at the synchronous GFP mapper 10.

For GFP-T decoding, the incoming GFP superblocks, which are in 64B/65B format, are decoded and any PAD characters are dropped by the GFP frame decoder 70. The scheme converts 65 bits of information to a stream of 80 bits, which includes eight 10B code words. Data code words are converted to the appropriate 10-bit values with the proper running disparity, while four-bit control encodings are converted back to the appropriate 10-bit control code words with proper running disparity. Errored code words are converted to a special 10B_ERR control code that produces a coding violation at the downstream receiver. The resulting output data stream, made up of 8-bit data 86 encoded into 10-bit data, control, or error codes 68, is operating at same rate as the ingress 10-bit data stream 16.

Figure 3:
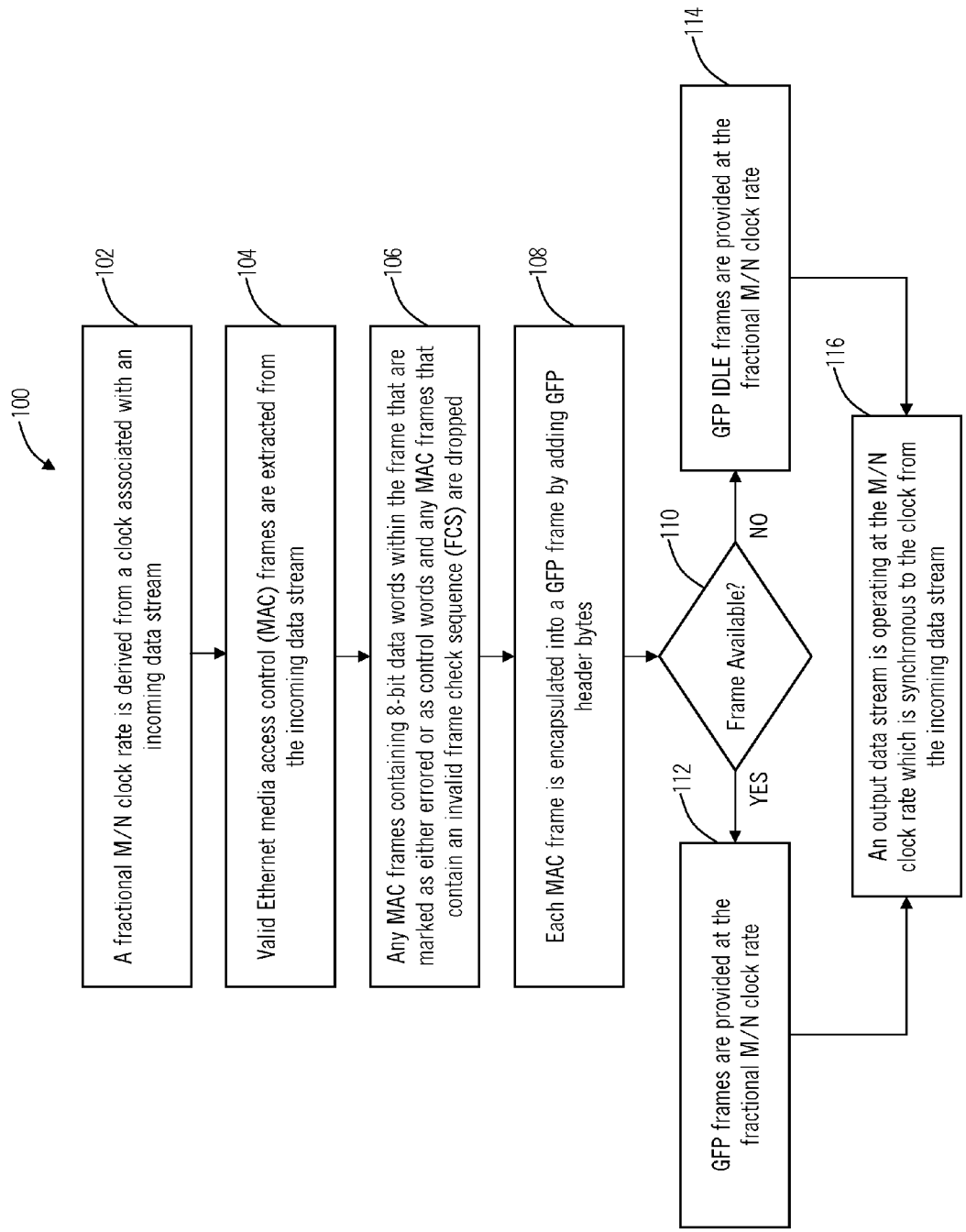
FIG. 3 is a flowchart of a synchronous GFP-F mapping mechanism according to an exemplary embodiment of the present invention.

Referring to FIG. 3, a flowchart illustrates a synchronous GFP-F mapping mechanism 100 according to an exemplary embodiment of the present invention. A fractional M/N clock rate is derived from a clock associated with a synchronous incoming data stream (step 102). Valid Ethernet media access control (MAC) frames are extracted from the incoming data stream (step 104). MAC frames are delineated by valid start-of-frame (SOF) and end-of-frame (EOF) 10B control codes. Any MAC frames containing 8-bit data words within the frame that are marked as either errored or as control words and any MAC frames that contain an invalid frame check sequence (FCS) are dropped (step 106). Each MAC frame is then encapsulated into a GFP frame by adding GFP header bytes (step 108). An output data stream is produced with both GFP frames and GFP IDLE frames responsive to whether an input frame is available (step 110).

When there is a GFP data frame ready to be transmitted, GFP frames are provided at the fractional M/N clock rate (step 112). When there are no GFP data frames, GFP IDLE frames are provided at a gapped clock rate at the fractional M/N clock rate (step 114). Here, the gapped clock includes a sequence of clock pulses which is always a multiple of four (each GFP IDLE frame is four 8-bit words). When another GFP data frame is available and a number of Send Idle pulses is a multiple of four, the synchronous GFP-F mapping mechanism 100 returns to step 110. An output data stream is operating at the M/N Clock rate which is synchronous to the clock from the incoming data (step 116).

Figure 4A:
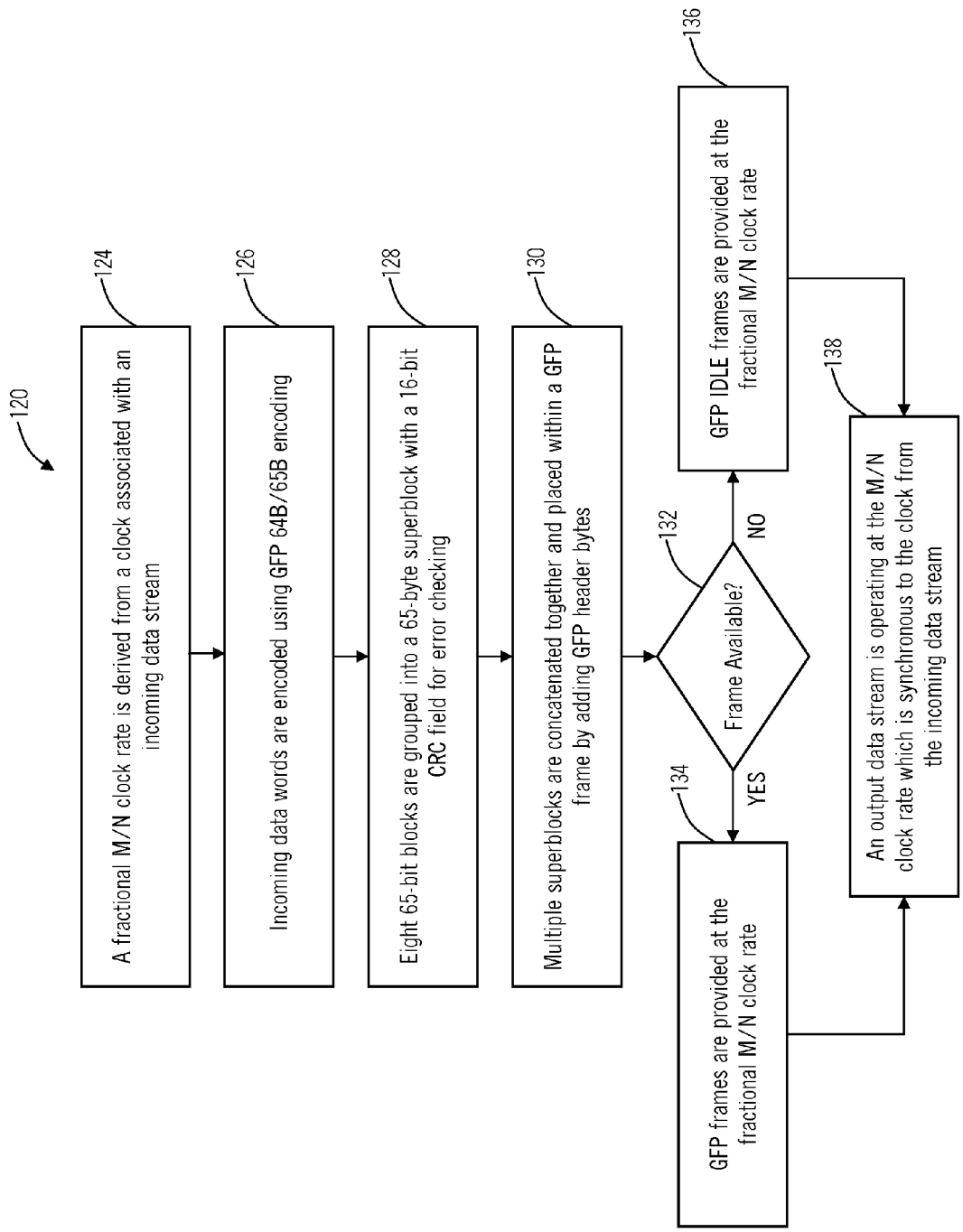
FIGS. 4a and 4b are flowcharts of synchronous GFP-T mapping mechanisms utilizing GFP IDLE frames and PAD characters according to an exemplary embodiment of the present invention.
Figure 4B:
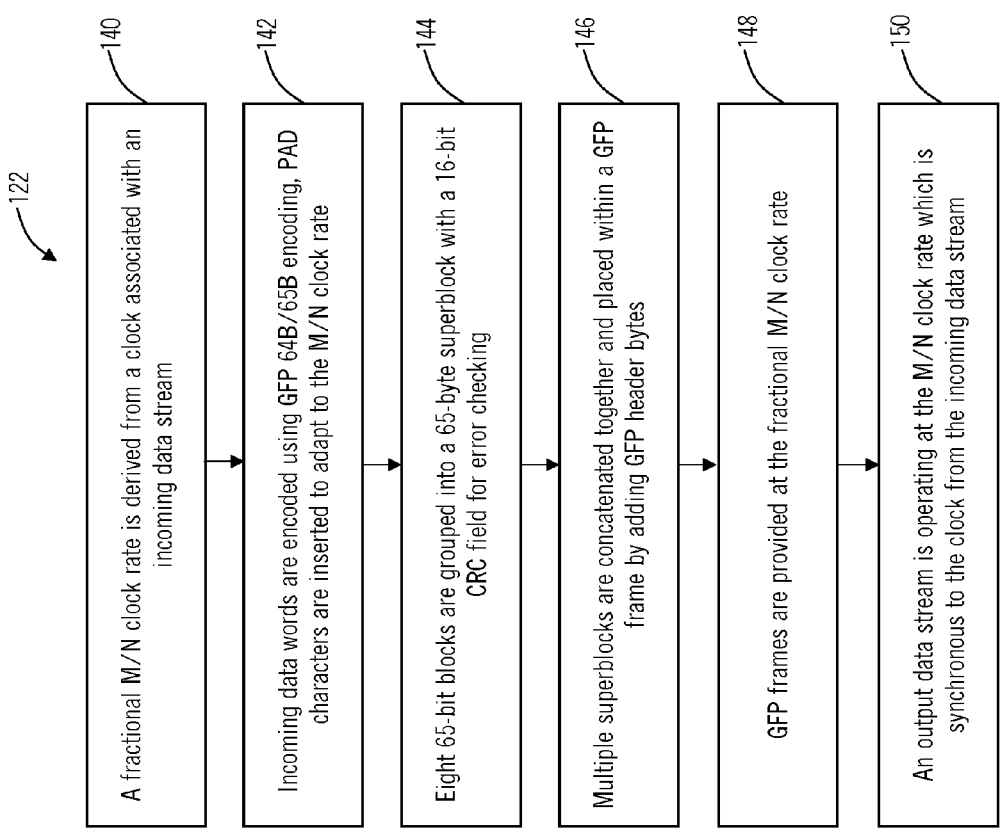

Referring to FIGS. 4a and 4b, flowcharts illustrates synchronous GFP-T mapping mechanisms 120, 122 according to an exemplary embodiment of the present invention. The synchronous GFP-T mapping mechanism 120 illustrates utilizing GFP IDLE frames to adapt GFP frames to a derived fractional M/N clock rate. The synchronous GFP-T mapping mechanism 122 illustrates utilizing PAD characters to adapt GFP frames to a derived fractional M/N clock rate.

In FIG. 4a, the synchronous GFP-T mapping mechanism 120 starts by deriving a fractional M/N clock rate from a clock associated with a synchronous incoming data stream (step 124). Incoming data words are first encoded using a GFP 64B/65B encoding (step 126). Here, the incoming data words are converted to a stream of eight 10B code words, which includes 80 bits, and then encoded into 65 bits of information. Data code words are converted to their eight-bit values while Control code words are converted to four-bit values. Errored code words are converted to a special four-bit code indicating an error.

Eight 65-bit blocks are grouped into a 65-byte superblock and a 16-bit CRC field is added to provide error checking (step 128). Multiple superblocks are concatenated together and placed within a GFP frame by adding GFP header bytes (step 130). An output data stream is produced with both GFP frames and GFP IDLE frames and/or PAD characters responsive to whether an input frame is available (step 132). When there is a GFP data frame ready to be transmitted, GFP frames are provided at the fractional M/N clock rate (step 134). When there are no GFP data frames, GFP IDLE frames are provided at a gapped clock rate at the fractional M/N clock rate (step 136). An output data stream is operating at the M/N Clock rate which is synchronous to the clock from the incoming data (step 138).

In FIG. 4b, the synchronous GFP-T mapping mechanism 122 starts by deriving a fractional M/N clock rate from a clock associated with a synchronous incoming data stream (step 140). Incoming data words are first encoded using a GFP 64B/65B encoding, and PAD characters are inserted to adapt to the fractional M/N clock rate (step 142). Here, the incoming data words are converted to a stream of eight 10B code words, which includes 80 bits, and then encoded into 65 bits of information. Data code words are converted to their eight-bit values while Control code words are converted to four-bit values. Errored code words are converted to a special four-bit code indicating an error.

Eight 65-bit blocks are grouped into a 65-byte superblock and a 16-bit CRC field is added to provide error checking (step 144). Multiple superblocks are concatenated together and placed within a GFP frame by adding GFP header bytes (step 146). GFP frames are provided at the fractional M/N clock rate (step 148). An output data stream is operating at the M/N Clock rate which is synchronous to the clock from the incoming data (step 150).

Figure 5:
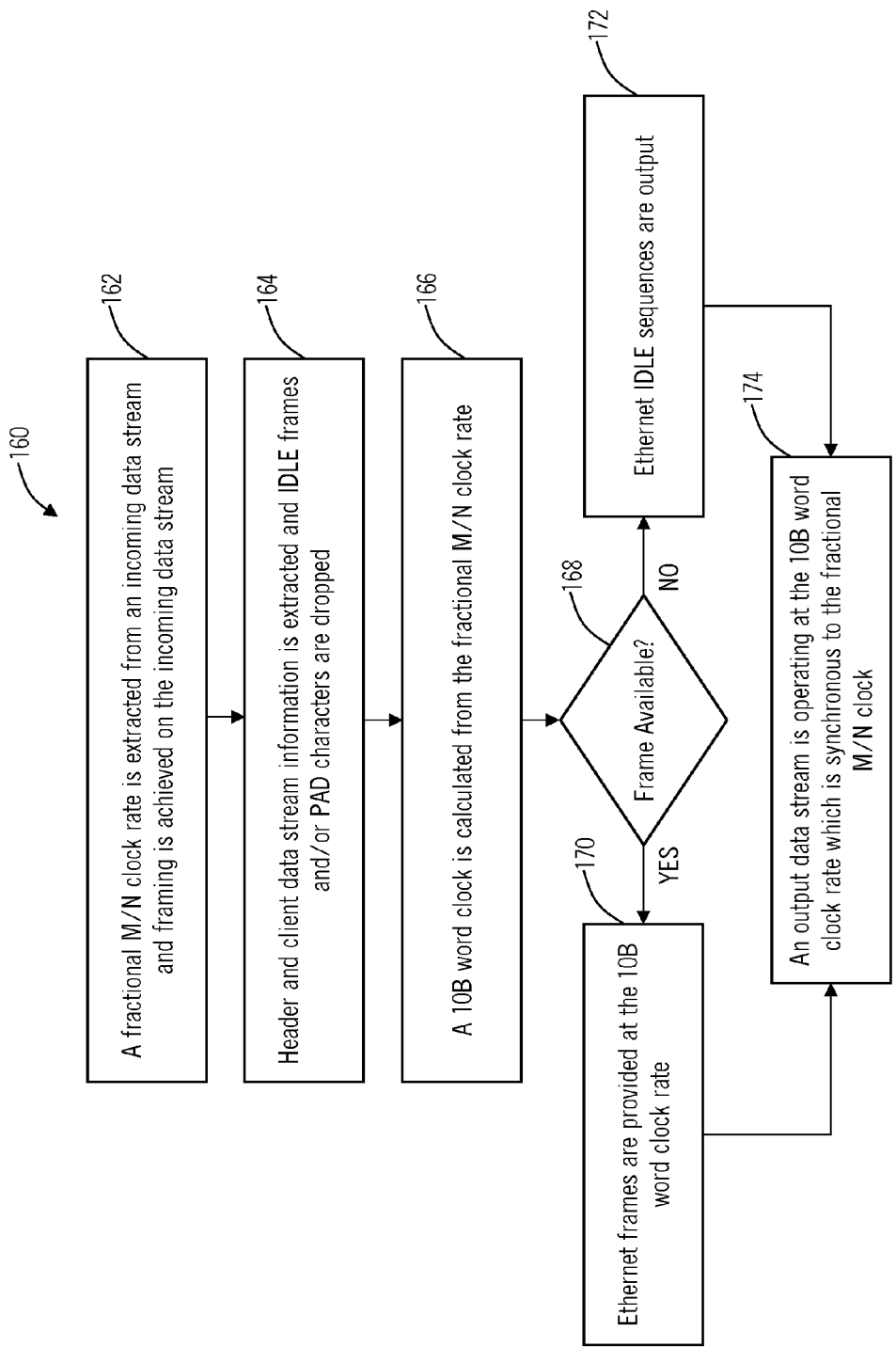
FIG. 5 is a flowchart of a synchronous GFP demapping mechanism according to an exemplary embodiment of the present invention.

Referring to FIG. 5, a flowchart illustrates a synchronous GFP demapping mechanism 160 according to an exemplary embodiment of the present invention. A fractional M/N clock rate is extracted from a synchronous incoming data stream (step 162). Header and client data stream information is extracted from the synchronous incoming data stream, and IDLE and/or PAD characters are dropped (step 164). A 10B word clock is calculated from the fractional M/N clock rate (step 166). An output data stream is produced with both Ethernet frames and Ethernet IDLE sequences responsive to whether an input frame is available (step 168). When there is an Ethernet frame ready to be transmitted, the Ethernet frame is provided at the 10B word clock rate (step 170). When there is no Ethernet frame ready to be transmitted, Ethernet IDLE sequences are output (step 172). An Ethernet output data stream is operating at the 10B word clock rate which is synchronous to the clock from the incoming data (step 174).

Figure 6:
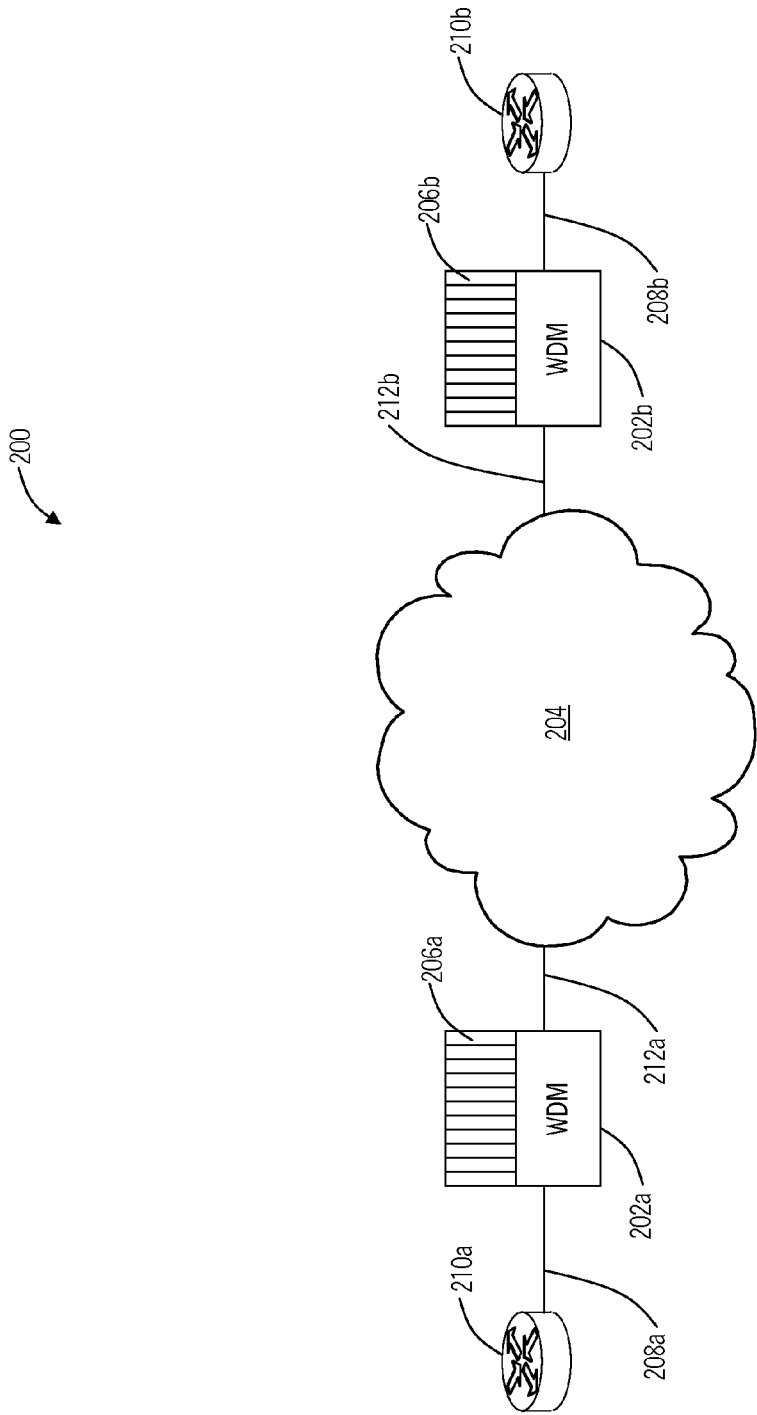
FIG. 6 is a network illustrating an exemplary application of the synchronous GFP mapper of FIG. 1 and the synchronous GFP demapper of FIG. 2 according to an exemplary embodiment of the present invention.

Referring to FIG. 6, a network 200 illustrates an exemplary application of the synchronous GFP mapper 10 and the synchronous GFP demapper 50 according to an exemplary embodiment of the present invention. The network 200 includes two wavelength division multiplexing (WDM) network elements (NEs) 202a, 202b interconnected over an optical network 204. Each WDM NE 202a, 202b can include a plurality of line card 206a, 206b. The line cards 206a, 206b generally include electric circuitry, optical interfaces, and communication mechanisms to other line cards. For example, the line cards 206a, 206b can include interfaces 208a, 208b to routers/switches 210a, 210b, respectively. These interfaces 208a, 208b can include Ethernet signals, e.g. 1 GbE, 10 GbE, 100 GbE, and the like.

The WDM NEs 202a, 202b can include the synchronous GFP mapper 10 and the synchronous GFP demapper 50 to directly map synchronous Ethernet signals or the like from the clients, i.e. the routers/switches 210a, 210b, to OTN thereby removing requirements for intermediate layers, e.g. SONET/SDH, to preserve synchronization. For example, the synchronous GFP mapper 10 and the synchronous GFP demapper 50 can be implemented as one of the line cards 206a, 206b, or as part of one of the line cards 206a, 206b. The WDM NEs 202a, 202b can provide synchronous Ethernet over OTN links 212a, 212b on the optical network 204. The network 200 is shown for illustration purposes, and those of ordinary skill in the art will recognize the synchronous GFP mapper 10 and the synchronous GFP demapper 50 can be implemented in a variety of ways in a variety of different telecom and datacom devices.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A synchronous Generic Framing Protocol mapper, comprising:
    a fractional M/N clock generator configured to receive an incoming client timing signal and to generate a M/N clock by digitally multiplying the incoming client timing signal by a ratio M/N where M and N comprise integers; and
    a frame encoder configured to receive an incoming client signal and to encode the incoming client signal into Generic Framing Protocol frames such that an output signal comprising a Generic Framing Protocol-mapped signal operates synchronously with the M/N clock;
    wherein the Generic Framing Protocol-mapped signal is used directly on Optical Transport Network without an intervening Synchronous Optical Network/Synchronous Digital Hierarchy layer there between;
    wherein the Generic Framing Protocol-mapped signal comprises a frame mapped Generic Framing Protocol signal, and wherein the frame encoder is configured to:
    extract valid Ethernet media access control and data frames from the incoming client signal;
    drop errored frames, control frames, and frames with invalid frame check sequence;
    encapsulate remaining frames into a Generic Framing Protocol frame with a Generic Framing Protocol header;
    provide Generic Framing Protocol frames responsive to the M/N clock; and
    signal to an IDLE generator to provide Generic Framing Protocol IDLE frames responsive to no Generic Framing Protocol frame availability.

2. The synchronous Generic Framing Protocol mapper of claim 1, further comprising:
    a decoder configured to receive an incoming client signal and to decode the incoming client signal.

3. The synchronous Generic Framing Protocol mapper of claim 2, wherein the decoder is configured to perform 8B/10B decoding, to determine validity of each data word from the incoming client signal, to determine whether each data word from the incoming signal is a control word or a data word, and to output each data word, an error indication, and a control/data word indication to the frame encoder.

4. The synchronous Generic Framing Protocol mapper of claim 1, further comprising:
    a multiplexer configured to receive Generic Framing Protocol frames from the frame encoder and to insert Generic Framing Protocol IDLE frames responsive to the M/N clock from an IDLE generator responsive to no Generic Framing Protocol frame availability from the frame encoder.

5. The synchronous Generic Framing Protocol mapper of claim 4, further comprising:
    an Optical Transport Network constant bit-rate mapper configured to receive an output of the multiplexer, wherein the Optical Transport Network constant bit-rate mapper utilizes justification control and data justification functions to adapt a rate of the output of the multiplexer to a payload clock from a system clock.

6. The synchronous Generic Framing Protocol mapper of claim 4, further comprising:
    a Regenerator/Reshaper/Retimer device configured to receive an output of the multiplexer.

7. A synchronous Generic Framing Protocol demapper, comprising:
    a fractional M/N clock generator configured to receive an incoming M/N clock from a client timing signal and to generate an outgoing client clock signal by digitally multiplying the incoming client timing signal by a ratio N/M where M and N comprise integers; and
    a frame decoder configured to receive a Generic Framing Protocol-mapped incoming signal and to decode the incoming signal from Generic Framing Protocol frames such that an output signal comprising a client signal operates synchronously with the incoming M/N clock;
    wherein the Generic Framing Protocol-mapped incoming signal is received directly from Optical Transport Network without an intervening Synchronous Optical Network/Synchronous Digital Hierarchy layer there between;
    wherein the Generic Framing Protocol-mapped incoming signal comprises a frame mapped Generic Framing Protocol signal, and wherein the frame decoder is configured to:
    receive the Generic Framing Protocol-mapped incoming signal;
    interpret header information;
    extract client data stream information;
    output an Ethernet frame from the client data stream information synchronous to the outgoing client clock signal; and signal to an IDLE generator to provide Ethernet IDLE sequences responsive to no Ethernet frame availability.

8. The synchronous Generic Framing Protocol demapper of claim 7, further comprising:
an encoder configured to receive an output signal and to encode the output signal into an 8B/10B format.

9. The synchronous Generic Framing Protocol demapper of claim 7, further comprising:
a selector configured to receive control words, data words, a control/data word indicator, and a frame available signal from the frame decoder and to insert IDLE Ethernet sequences from an IDLE generator responsive to no frame availability from the frame decoder.

10. The synchronous Generic Framing Protocol demapper of claim 9, further comprising:
an Optical Transport Network constant bit-rate demapper configured to provide an output to the frame decoder.

11. The synchronous Generic Framing Protocol demapper of claim 9, further comprising:
a Regenerator/Reshaper/Retimer device configured to provide an output to the frame decoder.

12. A synchronous Generic Framing Protocol mapper, comprising:
a fractional M/N clock generator configured to receive an incoming client timing signal and to generate a M/N clock by digitally multiplying the incoming client timing signal by a ratio M/N where M and N comprise integers; and
a frame encoder configured to receive an incoming client signal and to encode the incoming client signal into Generic Framing Protocol frames such that an output signal comprising a Generic Framing Protocol-mapped signal operates synchronously with the M/N clock;
wherein the Generic Framing Protocol-mapped signal is used directly on Optical Transport Network without an intervening Synchronous Optical Network/Synchronous Digital Hierarchy layer there between;
wherein the Generic Framing Protocol-mapped signal comprises a transparent Generic Framing Protocol signal, and wherein the frame encoder is configured to:
perform 64B/65B encoding of the incoming client signal, wherein data code words are converted to eight-bit values, control code words are converted to four-bit values, and errored code words are converted to a special four-bit code indicating an error;
group blocks from the 64B/65B encoding into a superblock;
encapsulate the superblock into a Generic Framing Protocol frame with a Generic Framing Protocol header;
provide Generic Framing Protocol frames responsive to the M/N clock; and
perform one of signal to an IDLE generator to provide Generic Framing Protocol IDLE frames responsive to no Generic Framing Protocol frame availability, insert a PAD code word, and a combination thereof.

13. The synchronous Generic Framing Protocol mapper of claim 12, further comprising:
a decoder configured to receive an incoming client signal and to decode the incoming client signal.

14. The synchronous Generic Framing Protocol mapper of claim 13, wherein the decoder is configured to perform 8B/10B decoding, to determine validity of each data word from the incoming client signal, to determine whether each data word from the incoming signal is a control word or a data word, and to output each data word, an error indication, and a control/data word indication to the frame encoder.

15. The synchronous Generic Framing Protocol mapper of claim 12, further comprising:
a multiplexer configured to receive Generic Framing Protocol frames from the frame encoder and to insert Generic Framing Protocol IDLE frames responsive to the M/N clock from an IDLE generator responsive to no Generic Framing Protocol frame availability from the frame encoder.

16. The synchronous Generic Framing Protocol mapper of claim 15, further comprising:
an Optical Transport Network constant bit-rate mapper configured to receive an output of the multiplexer, wherein the Optical Transport Network constant bit-rate mapper utilizes justification control and data justification functions to adapt a rate of the output of the multiplexer to a payload clock from a system clock.

17. The synchronous Generic Framing Protocol mapper of claim 15, further comprising:
a Regenerator/Reshaper/Retimer device configured to receive an output of the multiplexer.

18. A synchronous Generic Framing Protocol demapper, comprising:
a fractional M/N clock generator configured to receive an incoming M/N clock from a client timing signal and to generate an outgoing client clock signal by digitally multiplying the incoming client timing signal by a ratio N/M where M and N comprise integers; and
a frame decoder configured to receive a Generic Framing Protocol-mapped incoming signal and to decode the incoming signal from Generic Framing Protocol frames such that an output signal comprising a client signal operates synchronously with the incoming M/N clock;
wherein the Generic Framing Protocol-mapped incoming signal is received directly from Optical Transport Network without an intervening Synchronous Optical Network/Synchronous Digital Hierarchy layer there between;
wherein the Generic Framing Protocol-mapped signal comprises a transparent Generic Framing Protocol signal, and wherein the frame decoder is configured to:
receive the Generic Framing Protocol-mapped incoming signal;
interpret header information;
extract client data stream information;
drop any PAD characters;
output an Ethernet frame from the client data stream information synchronous to the outgoing client clock signal; and
signal to an IDLE generator to provide Ethernet IDLE sequences responsive to no Ethernet frame availability.

19. The synchronous Generic Framing Protocol demapper of claim 18, further comprising:
an encoder configured to receive an output signal and to encode the output signal into an 8B/10B format.

20. The synchronous Generic Framing Protocol demapper of claim 19, further comprising:
a selector configured to receive control words, data words, a control/data word indicator, and a frame available signal from the frame decoder and to insert IDLE Ethernet sequences from an IDLE generator responsive to no frame availability from the frame decoder.

* * * * *